Sept. 22, 1964

F. W. SIMON 3,150,315

METHOD AND APPARATUS FOR TESTING IMPEDANCE ELEMENTS
UTILIZING A MODIFIED WHEATSTONE BRIDGE

Filed Dec. 31, 1956

(a)

(b)

(c)

INVENTOR.
FRED W. SIMON

BY
AGENT

United States Patent Office 3,150,315
Patented Sept. 22, 1964

3,150,315
METHOD AND APPARATUS FOR TESTING IM-
PEDANCE ELEMENTS UTILIZING A MODIFIED
WHEATSTONE BRIDGE
Fred W. Simon, Plainview, N.Y., assignor, by mesne
assignments, to Dynamics Corporation of America,
New York, N.Y., a corporation of New York
Filed Dec. 31, 1956, Ser. No. 631,661
14 Claims. (Cl. 324—62)

This invention relates to electrical testing apparatus, and in particular to a method and apparatus for determining the deviation of an impedance element from its nominal value.

Many electronic circuits require resistors having actual ohmic values that are extremely close to their nominal values. For example, resistors used in analog computers often have tolerance limits not exceeding ±0.01% of their nominal value. Resistors having even closer minimum and maximum tolerance limits are not uncommon. These tolerances may not be exceeded if the equipment using the resistors is to operate with the requisite accuracy. Manufacturing high precision components is a difficult process. Since one or more manufactured resistors of a given lot may not meet prescribed tolerance limits, it is necessary that each unit be individually tested. Test equipment for this application must, of course, be accurate, and should permit an operator to quickly determine whether the deviation of a given resistor from its nominal value is allowable. In addition, it should be possible to determine the magnitude and direction of the deviation since this may be of considerable importance in establishing whether corrective steps are required in the manufacture of the resistors.

In the present invention, a voltage corresponding to the difference between the actual value of an unknown resistor under test and its nominal value is compared with a pair of reference voltages. One of the two reference voltages corresponds to the upper allowable resistance limit and the other reference voltage corresponds to the lower allowable limit. Each of the voltages is connected, in succession, to the vertical deflecting plates of a cathode-ray oscilloscope. By comparing the magnitude of the deflection corresponding to the deviation of the unknown resistor from its nominal value with the deflections due to the reference voltages, it is possible to quickly ascertain whether the unknown resistor falls within or without the allowable limits. Also, by noting the ratio of the reference voltages to the voltage corresponding to the deviation of the unknown resistor, the actual deviation of the unknown resistor may be precisely determined.

A modified Wheatstone bridge is used to obtain the necessary voltages. Each of the ratio arms of the bridge comprise a resistor having one or more taps thereon, or instead of taps, each ratio arm may be divided into individual resistors connected in series. The third arm of the bridge consists of the unknown resistor to be tested, and the fourth arm is the standard resistor which has a value equal to the nominal resistance of the unknown divided by the bridge ratio.

The tap on one of the ratio arms is so placed that the voltage appearing between it and junction of the two ratio arms is equal to the voltage appearing at the output terminals of the bridge when the unknown resistor has a value equal to its upper tolerance limit. The tap on the other ratio arm is so located that the voltage appearing between it and the junction of the two ratio arms is equal to the bridge output voltage when the unknown resistor has a value equal to its lower tolerance limit. By sampling the tap voltages and the bridge output voltage periodically and displaying them on the face of a cathode-ray oscilloscope, the operator can accurately determine the deviation of the unknown resistor from its nominal value.

It is a principal object of this invention to provide apparatus for testing precision components which enables an operator to rapidly determine whether a component is within or without specified limits to a high degree of accuracy.

Another object of the invention is to provide testing apparatus that will permit the operator to determine accurately the deviation of the component from its nominal value.

Another important object is to provide apparatus that is independent of changes in the bridge supply voltage or of variations in the gain of amplifiers associated with the equipment.

Other objects and advantages will become apparent from the following description, the appended claims, and the drawing of which:

Figure 1:
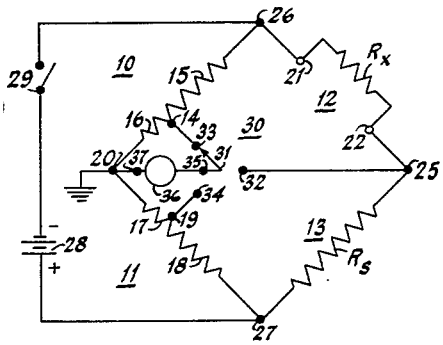
FIG. 1 is a schematic diagram of the invention illustrating its theory of operation.

Referring to FIG. 1, there is shown a bridge circuit comprised of ratio arms 10 and 11, an unknown arm 12, and a standard arm 13. Ratio arm 10 consists of a resistor separated by a tap 14 into two portions 15 and 16, while ratio arm 11 comprises a resistor having two portions 17 and 18, divided by a tap 19. The total resistance of ratio arm 11 is equal to the total resistance of ratio arm 10 divided by the bridge ratio, B. In some applications, it will be found more convenient to make resistive portions 15, 16, 17 and 18 separate resistors, tap 14 then being connected to the junction between resistors 15 and 16 and tap 19 being connected to the junction between resistors 17 and 18. Resistive portions 16 and 17 are joined at junction 20 which is grounded to provide a voltage reference point.

The resistor to be tested, $R_x$, is connected to a pair of terminals 21 and 22 provided in the unknown arm 12. The standard resistor $R_s$, having a value equal to the nominal value of the unknown or specimen resistor $R_x$ divided by the bridge ratio, is the standard arm 13. Terminal 22 is connected at junction 25 to one end of standard resistor $R_s$ while terminal 21 is connected to resistive portion 15 of ratio arm 10 at junction 26. The other end of resistor $R_s$ is connected to resistive portion 18 of ratio arm 11 at junction 27. A source of direct voltage 28 is connected through a switch 29 to the bridge, the positive terminal of voltage source 28 being connected to junction 27 and the negative terminal being connected through switch 29 to junction 26.

A three-position switch 30 having a movable arm 31 and three stationary contacts 32, 33, and 34 is provided. The movable arm 31 is connected through output terminal 35 to one terminal of an indicator 36 which may be any suitable voltage detecting device having a high input impedance, such as a vacuum tube voltmeter or a cathode-ray oscilloscope. The other terminal of indicator 36 is connected to output terminal 37 which in turn is coupled to junction 20. Stationary contact 32 is connected to junction 25, stationary contact 33 is connected to tap 14, and stationary contact 34 is connected to tap 19. By moving arm 31 to each of the stationary contacts, in turn, the voltages present between junction 25 and ground, tap 14 and ground, and tap 19 and ground can be indicated successively on indicator 36.

When arm 31 is switched to contact 32, the bridge output voltage appearing between junction 25 and ground is connected to indicator 36. If the ohmic value of the unknown resistor, $R_x$, is equal to its nominal value the meter will read zero since the bridge is balanced and junctions 20 and 25 will be at the same potential. If the value of $R_x$ is greater than its nominal value, junction 25 will be positive with respect to junction 20, since a larger percentage of the voltage between junctions 26 and 27 will now appear across $R_x$. If the ohmic value of $R_x$ is less than its nominal value, junction 25 will be negative with respect to junction 20 since a larger percentage of the voltage between junctions 26 and 27 now appears across $R_s$. If indicator 36 is a zero center instrument, then a deflection to the right when junction 25 is positive with respect to ground will indicate that $R_x$ has a greater resistance than nominal and a deflection to the left when junction 25 is negative with respect to ground will indicate that $R_x$ has a lower resistance than nominal.

When arm 31 engages contact 33, indicator 36 is connected between tap 14 and ground. Since junction 26 is negative with respect to junction 27, tap 14 will be negative with respect to grounded junction 20. By properly selecting the position of tap 14 on ratio arm 10, the voltage across resistive portion 16 can be made equal in magnitude to the voltage that would appear between junction 25 and ground when the actual ohmic resistance of the unknown resistor $R_x$ is exactly equal to its lower tolerance limit. Similarly, when arm 31 is switched to contact 34, indicator 36 is connected between tap 19 and ground. Tap 19 is positive with respect to ground, and by properly positioning it on ratio arm 11, the voltage across resistive portion 17 can be made equal in magnitude to the voltage that appears between junction 25 and ground when the actual ohmic resistance of resistor $R_x$ is exactly equal to its upper tolerance limit.

By switching arm 31 to contact 33 and then to contact 34, the indicator deflections corresponding to the lower and upper tolerance limits respectively can be obtained. When the deflection obtained when arm 31 is connected to contact 32 exceeds that corresponding to either tolerance limit, the unknown resistor $R_x$ is outside of the tolerance limits; and if the deflection is less, the resistance of $R_x$ is within the tolerance limits. The amount of deviation of resistor $R_x$ from nominal is determined from the ratio of the deflection corresponding to the deviation of the unknown resistor to the deflections corresponding to the tolerance limits. Whether the deviation of the resistor $R_x$ is more or less than nominal is determined by the direction of the indicator deflection.

Variations in the magnitude of voltage source 28 or in the gain of any amplifier associated with indicator 36 will have no effect on the operation of the device since the ratio of the voltage between junction 25 and ground and the voltages between either tap and ground is independent of these variations.

The resistive portions of ratio arms 10 and 11 are determined by the upper and lower tolerance limits, the bridge ratio, and the total resistance of ratio arm 10. One method for determining the values of resistive portions 15 and 16 of ratio arm 10 is by the following equations:

$$R_{15} = R_{10}\left[\frac{(1+B)(1-K_1)}{1+B(1-K_1)}\right] \quad (1)$$

$$R_{17} = R_{10}\left[\frac{K_1}{1+B(1-K_1)}\right] \quad (2)$$

where $R_{15}$=the ohmic value of resistive portion 15
$R_{10}$=the ohmic value of ratio arm 10

$B$=the bridge ratio, the resistance of ratio arm 10 divided by the resistance of the ratio arm 11
$K_1$=the per unit lower tolerance limit for the unknown resistor $R_x$
$R_{16}$=the ohmic value of resistive portion 16

The values of resistive portions 17 and 18 of ratio arm 11 can be obtained from the following expressions:

$$R_{17} = R_{10}\left[\frac{K_u}{1+B(1+K_u)}\right] \quad (3)$$

$$R_{18} = \frac{R_{10}}{B}\left[\frac{1+B}{1+B(1+K_u)}\right] \quad (4)$$

where $R_{17}$=the ohmic value of resistive portion 17
$K_u$=the per unit upper tolerance limit for the unknown resistor $R_x$
$R_{18}$=the ohmic value of resistive portion 18

The above expressions are derived by equating the bridge output voltages obtained when the value of the unknown resistor is equal to each of its tolerance limits to the corresponding tap voltage and solving for the ratio arm resistances.

When resistors having narrow tolerance limits are to be checked it will be found more convenient to make the resistive portions of the ratio arms separate resistors, rather than tapping the ratio arms. For example, assume that the nominal value of the unknown resistor is 100,000 ohms and its maximum allowable deviation is ±0.01%, that is, its resistance must be between 99,990 and 100,010 ohm. Assume further that the bridge ratio is unity and the resistance $R_{10}$ of ratio arm 10, has been arbitrarily selected to be equal to $R_x$, or 100,000 ohms. Since $K_u=K_1=0.0001$ per unit, the quantities $(1-K_1)$ and $(1+K_u)$ are very nearly equal to one and substituting these values in Equations 1 to 4 gives the result that $R_{15}$ and $R_{18}$ may be made equal to 100,000 ohms, and $R_{16}$ and $R_{17}$ may be made equal to 5 ohms. While $R_{15}$ and $R_{18}$ must be precision resistors, i.e. of the same order of precision as standard resistor $R_s$, the ohmic values $R_{16}$ and $R_{17}$ are not as critical and they may have comparatively wider tolerances.

With these parameters, when $R_x$=99,990 ohms, the deflection obtained when indicator 36 is connected by switch 30 to junction 25 will be very nearly equal in magnitude and in the same direction as that obtained when switch 30 is connected to the junction of resistors 15 and 16. When $R_x$=100,010 ohms, the deflection obtained as a result of the voltage between junction 25 and ground will be equal in magnitude and direction to that obtained from the voltage between the junction of resistors 17 and 18 and ground.

Figure 2:
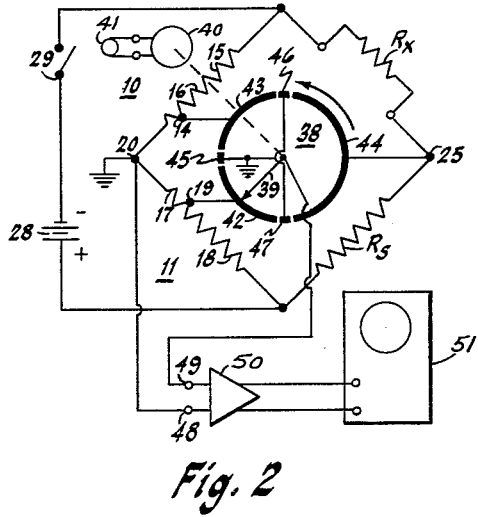
FIG. 2 is a schematic diagram of one embodiment of the invention employing a rotary selector switch.

In FIG. 2, the three-position switch 30 has been replaced by a motor driven selector switch 38 having a rotating arm 39 driven by a motor 40 energized from a suitable voltage source 41. The stationary portion of the switch is divided into conducting segments 42 to 47, which are electrically insulated from each other. Segment 42 is connected to tap 19 on ratio arm 11 and segment 43 is connected to tap 14 on ratio arm 10. Segment 44 is connected to junction 25 between the unknown and standard arms. Segments 45, 46 and 47, which are located between and insulated from segments 42, 43 and 44, are grounded. Junction 20 is coupled to output terminal 48 and rotating arm 39 is coupled to output terminal 49. An amplifier 50 couples the voltage across the output terminals to a cathode-ray oscilloscope 51 to provide an indication of the voltage appearing across the terminals. As arm 39 is rotated by motor 40, the voltages impressed on the conducting segments appear, in turn, at the output terminals 48 and 49 of the bridge circuit.

Figure 3:
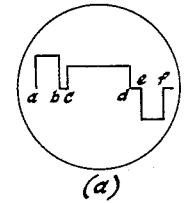
FIG. 3 illustrates the oscillograms appearing on the screen of a cathode-ray oscilloscope when connected to the bridge circuit of this invention.
Figure 3:
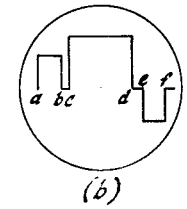
Figure 3:
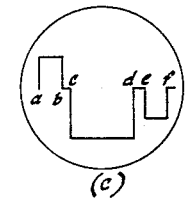

FIG. 3 shows the voltage waveforms appearing on the screen of the oscilloscope for different values of the unknown resistor $R_x$ in the absence of noise. In order to obtain an optimum presentation, pickup of extraneous noise voltages should be minimized by proper shielding and arrangement of components. FIG. 3a shows the waveform resulting when $R_x$ has an ohmic value between its nominal value and its upper tolerance limit. FIG. 3b depicts the oscilloscope screen when $R_x$ has a value greater than the upper tolerance limit and FIG. 3c when $R_x$ is less than the lower tolerance limit. The frequency of the sweep voltage applied to the horizontal deflecting plates of the oscilloscope is selected so that a single cycle of the voltages present at output terminals 48 and 49 during one complete rotation of arm 39 will be viewed on the screen.

During the time interval a–b, the oscilloscope is connected to sample the voltage across resistive portion 17 since arm 39 of switch 38 is contacting conducting segment 42 during this portion of the cycle. The deflection obtained during the time a–b is proportional to the predetermined upper tolerance limit due to the location of tap 19 on ratio arm 11.

During the next time interval b–c, arm 39 has rotated counterclockwise to grounded marker segment 47 so that there is no deflection on the screen. This interval of zero deflection marks the end of the upper tolerance limit calibration voltage and the beginning of the next interval.

During the interval c–d, arm 39 is moving on segment 44 which is connected to junction 25 of the bridge. The voltage appearing at terminals 48 and 49 during this portion of the cycle corresponds to the deviation of the unknown resistor $R_x$ from its nominal value. If $R_x$ is exactly equal to its nominal value the output voltage will be zero and there will be no deflection on the screen during the interval c–d. If the value of $R_x$ is within tolerance limits but greater than nominal, the picture appearing in FIG. 3a will result. If $R_x$ exceeds the positive or negative tolerance limits, the pictures shown in FIG. 3b and FIG. 3c respectively will appear on the screen.

During the interval d–e, there is no deflection on the screen since arm 39 is connected to grounded marker segment 46 to indicate the beginning of a new interval. Marker intervals b–c and d–e make it easier to read the oscilloscope screen when the value of the unknown resistor is very close to one of its tolerance limits since they provide a means for readily distinguishing the reference intervals from the measurement interval.

The next portion of the cycle e–f, results when arm 39 is rotated to conducting segment 43 and the voltage across resistive portion 16 of ratio arm 10 is viewed on the scope. This voltage corresponds to the lower tolerance limit, the bridge unbalance voltage being compared with it to determine whether the unknown resistor exceeds its lower tolerance limit.

The portions b–c, d–e, and f–a which are produced when arm 39 contacts the grounded marker segments 47, 46, and 45, respectively, provide a convenient zero reference for permitting an operator to calibrate deflection of the oscilloscope in terms of the prescribed upper and lower tolerance units. Thu, the operator may readily measure the actual tolerance values of the unknown resistors being tested. Moreover, the operator may determine at a glance whether an unknown resistor is within the prescribed upper and lower tolerance limits. By noting the ratio of the deflection obtained during the measuring time interval c–d to the deflection provided by the reference voltages, the operator may also determine the percentage, if any, that the unknown resistor deviates from its nominal value.

Figure 4:
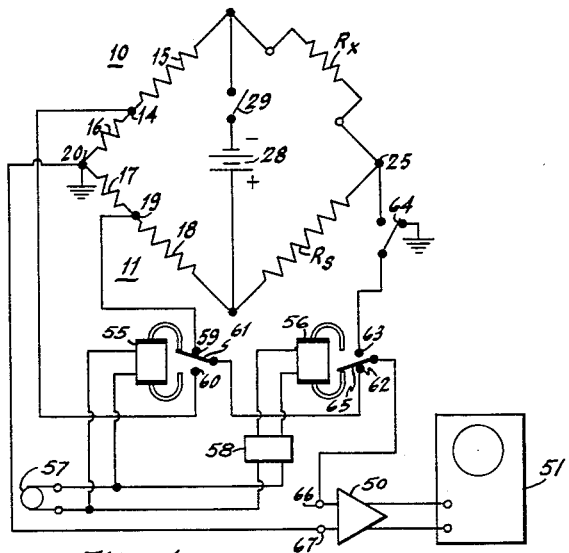
FIG. 4 shows another embodiment of the invention employing a switching circuit comprised of relays operating in quadrature time phase.

FIG. 4 shows a preferred embodiment of this invention in which the three-position switch of FIG. 1 and the motor driven selector switch of FIG. 2 have been replaced by two polarized relays, i.e. tap selector relay 55 and voltage comparison relay 56.

The coil of tap selector relay 55 is energized directly from a sinusoidal voltage source 57 while the coil of voltage comparison relay 56 is energized by the output of a phase-shifting network 58. Phase shifter 58 may be of any known type producing an output voltage approximately 90° out-of-phase with its input voltage. The input of the phase shifter is connected to source 57 and, therefore, the voltage across the coil of relay 56 is in quadrature with the voltage across the coil of relay 55.

Tap selector relay 55 is provided with two fixed contacts 59 and 60; contact 59 being connected to junction 19 on ratio arm 11 and contact 60 being connected to junction 14 on ratio arm 10. The armature or movable contact 61 of relay 55 is centered between fixed contacts 59 and 60 when the relay coil is not energized, and oscillates between these fixed contacts when an alternating voltage is applied to the coil.

Voltage comparison relay 56 is likewise provided with two fixed contacts, 62 and 63. Contact 62 is connected to the armature or movable contact 61 of tap selector relay 55 and contact 63 is connected to the arm of a single-pole double-throw switch 64. In one position of switch 64, contact 63 is grounded and in the other position it is connected to junction 25 between the unknown and standard arms of the bridge.

Armature 65 oscillates between fixed contacts 62 and 63 when the phase-shifted alternating voltage from phase shifter 58 is applied to the coil of relay 56.

A pair of output terminals 66 and 67 are connected, respectively, to armature 65 and junction 20. The output voltage appearing across these terminals is amplified by amplifier 50 and displayed upon the screen of cathode-ray oscilloscope 51.

The waveform of the current flowing through the coil of relay 55 is shown in FIG. 5a, and the waveform of the current in the coil of the voltage comparison relay 56 is shown in FIG. 5b. Since these currents are in phase quadrature, transfer of armature 61 will be a quarter cycle out-of-phase with the transfer of armature 65.

Figure 5:
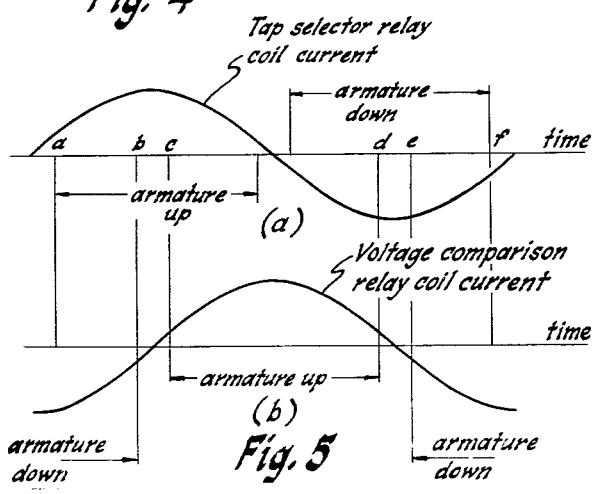
FIG. 5 illustrates the phase relationship between the currents applied to the relays of FIG. 4.

The position of the armatures shown in FIG. 4 corresponds to the time interval a–b of FIGS. 3 and 5. During this time interval a voltage corresponding to the upper tolerance limit of the unknown resistor is applied to the oscilloscope. The armature of relay 55 completes the circuit between junction 19 and oscilloscope 51 through contact 59 of relay 55 and contact 62 of relay 56, the armature of relay 55 being in what is arbitrarily designated as its "up" position and the armature of relay 56 being in its "down" position. During the period b–c, the armature of relay 56 is transferring from down to up and the oscilloscope deflection during this interval is zero, as shown in FIG. 3.

During the period c–d, armature 65 is up and the oscilloscope is connected through contact 63 and through the ungrounded position of switch 64 to junction 25. The oscilloscope deflection during this interval corresponds to the deviation of the specimen resistor from its nominal value.

During the interval d–e, armature 65 is transferring to its down position and at interval e–f both relay armatures are down connecting junction 14 to the oscilloscope through contact 60 of relay 55 and contact 62 of relay 56. During interval e–f a voltage corresponding to the lower tolerance limit is applied to oscilloscope 51. During the interval f–a, armature 61 is transferring from its down to its up position and the cycle is then repeated.

When switch 64 is in its grounded position, only the reference voltages appear on the oscilloscope screen since output terminal 66 is grounded when armature 65 is in its up position.

This invention may be used to measure the reactance of capacitors and inductors. The circuits of FIGS. 2 and 4 can be adapted for this application by replacing direct voltage source 28 with an alternating voltage source, and by coupling a phase-sensitive demodulator between amplifier 50 and oscilloscope 51. The reference voltage for the demodulator is obtained from the alternating voltage source having a frequency several times higher than the switching frequency. The impedance element to be tested is connected as the unknown arm of the bridge and an impedance having a value equal to the nominal value of the unknown impedance is used as the standard arm.

The oscillograms appearing on the screen of the oscilloscope will be similar to those shown in FIG. 3 and provide an indication of the deviation in the reactance of the unknown impedance from its nominal value. The performance of the bridge will be dependent upon the resistive components of the unknown and standard impedance elements and accurate measurements cannot be expected unless the ratio of the reactance to the resistance of the impedance elements is high.

Although only one tap is shown on each ratio arm of the bridge it is evident that a plurality of taps could be used on each arm, and the desired tolerance limit selected by a suitable switching arrangement. Similarly, each ratio arm could consist of a plurality of resistors, and switching means may be provided to enable the operator to select the resistor junction corresponding to the desired tolerance limits.

One of the significant features of this invention is that it provides a highly accurate indication of the deviation of the component under test from its nominal value that is independent of changes or fluctuation in external equipment. Variation in the bridge supply voltage produce proportionate changes in both the reference voltages and the voltage corresponding to the deviation of the component under test. Since it is the ratio of these two quantities that is significant, the accuracy of the indication will, in general, remain unaffected. Similarly, changes in the gain or other characteristic of the oscilloscope or external amplifying equipment will effect both the reference and measured quantities equally and the accuracy of the circuit will remain the same.

As many changes could be made in the above construction and many different embodiments of the invention could be made without departing from the scope thereof, it is intended that all matter contained in the above description or shown in the accompanying drawing shall be interpreted as illustrative and not in a limiting sense.

What is claimed is:

1. Apparatus for testing precision resistors comprising in combination, a bridge circuit having first and second series-connected ratio arms, each ratio arm including a pair of series-connected resistors, first and second terminal means for connecting the precision resistor to be tested as the unknown arm of said bridge, said first terminal means being connected to one end of said series-connected ratio arms, standard resistor means connected between said second terminal means and the other end of said series-connected ratio arms, said bridge circuit being adapted to be energized by an applied voltage coupled between the ends of said series-connected ratio arms, voltage indicating means having a pair of terminals, one of said pair of terminals being connected to the junction of said series-connected ratio arms, and means for connecting in succession the other of said pair of terminals to the junction of said pair of series-connected resistors forming said first ratio arm, the junction of said second terminal means and said standard resistor, and the junction of said pair of series-connected resistors forming said second ratio arm, said indicating means indicating the magnitudes of the voltages appearing across said pair of terminals.

2. Apparatus for testing impedance elements comprising in combination, a bridge circuit, said bridge circuit having first and second series-connected ratio arms, each ratio arm including an impedance element having first and second impedance portions and a tap at the junction of said impedance portions, first and second terminal means for connecting a specimen impedance element to be tested as the unknown arm of said bridge, said first terminal means being connected to one end of said series-connected ratio arms, a standard impedance element connected between said second terminal means and the other end of said series-connected ratio arms, a pair of output terminals, one of said output terminals being connected to the junction between said first and second ratio arms, and switching means connecting the tap on said first ratio arm, the tap on said second ratio arm, and the junction between said standard arm and said unknown arm to the other of said output terminals.

3. Apparatus for testing impedance elements as defined in claim 2 wherein each of said ratio arms comprises a resistance element having first and second resistance portions and a tap at the junctions of said resistance portions, said bridge circuit being adapted to be energized by a voltage coupled between the ends of said series-connected ratio arms, and indicating means coupled to said pair of output terminals for indicating the magnitude of the voltage appearing thereacross.

4. Apparatus adapted for indicating the deviation of an impedance element from its nominal value comprising in combination, a bridge circuit having first and second series-connected ratio arms, each ratio arm including an impedance element, first and second terminals for connecting a specimen impedance to be tested as the unknown arm of said bridge, said first terminal being coupled to one end of said series-connected ratio arms, a standard impedance element connected between said second terminal and the other end of said series-connected ratio arms, said bridge circuit being adapted for receiving an applied voltage coupled between the ends of said series-connected ratio arms, and indicating means coupled to said bridge for indicating the magnitudes of the voltage between a point intermediate the ends of the impedance element forming said first ratio arm and the junction of said series-connecting ratio arms, the voltage between a point intermediate the ends of the impedance element forming said second ratio arm and the junction of said series-connected ratio arms, and the voltage between the junction of said standard and unknown arms and the junction of said series-connected ratio arms.

5. Apparatus for testing precision resistors comprising in combination, a bridge circuit, said bridge circuit having first and second series-connected ratio arms, each ratio arm including a plurality of series-coupled resistance elements, first and second terminal means for connecting a specimen resistor to be tested as the unknown arm of said bridge, said first terminal means being coupled to one end of said series-connected ratio arms, means for connecting a standard resistance element between said second terminal means and the other end of said series-connected ratio arms, a pair of output terminals, one of said output terminals being connected to the junction between said first and second ratio arms, and switching means connecting in succession the junction between two of the series-coupled resistance elements forming said first ratio arm, the junction between two of the series-coupled resistance elements forming said second ratio arm, and the junction between said standard arm and said unknown arm to the other of said output terminals.

6. Apparatus for testing precision resistors comprising in combination, a bridge circuit having first and second series-connected ratio arms, each arm including a resistance element having a tap thereon, first and second terminal means for connecting a specimen resistor to be tested as the unknown arm of said bridge, said first terminal means being connected to one end of said series-connected ratio arms, standard resistor means connected between said second terminal means and the other end of said series-connected ratio arms, said bridge circuit being adapted to be energized by a direct voltage coupled between the ends of said series connected ratio arms, switching means having a common contact and a segmented portion, said segmented portion including first and second conductive segments connected respectively to the taps on said first and second ratio arms and a third conductive segment connected to the junction between said second terminal means and said standard resistor means, said conductive segments being insulated from each other, and indicating means connected between said common contact and the junction of said first and second ratio arms.

7. Apparatus for testing precision resistors as defined in claim 6 wherein said switching means comprises a rotary selector switch, and wherein the segmented portion of said selector switch further includes conductive marker segments located between and insulated from said first, second, and third segments, said marker segments being connected to each other and to the junction of said first and second ratio arms.

8. The method of determining the deviation of a specimen resistor from its nominal value comprising the steps of inserting the specimen resistor in the unknown arm of a resistance bridge circuit, producing a first reference voltage whose magnitude and polarity represents the output voltage from said resistance bridge circuit when the resistance of the specimen resistor is equal to its positive tolerance value, producing a second reference voltage whose magnitude and polarity represents the output voltage from said resistance bridge circuit when the resistance of the specimen resistor is equal to its negative tolerance value, and indicating in sequence the magnitude and polarity of the output voltage from said resistance bridge circuit, said first reference voltage and said second reference voltage.

9. The method of determining whether the resistance of a specimen resistor is within predetermined limits comprising the steps of inserting the specimen resistor in the unknown arm of a resistance bridge circuit, producing a first reference voltage whose magnitude and polarity corresponds to the output voltage from said bridge circuit when the specimen resistor has a resistance value equal to the upper predetermined limit, producing a second reference voltage whose magnitude and polarity corresponds to the output voltage from said bridge circuit when the specimen resistor has a resistance value equal to the lower predetermined limit, and indicating in succession the magnitude and polarity of the output voltage from said resistance bridge circuit, said first reference voltage, and said second reference voltage.

10. Apparatus for testing precision resistors comprising in combination, a bridge circuit having first and second series-connected ratio arms, each ratio arm including a plurality of series-connected resistance elements, first and second terminal means for connecting a specimen resistor to be tested as the unknown arm of said bridge, said first terminal means being connected to one end of said series-connected ratio arms, standard resistor means connected between said second terminal means and the other end of said series-connected ratio arms, tap selector switching means having a first fixed contact connected to the junction of two of the resistance elements forming said first ratio arm and a second fixed contact connected to the junction of two of the resistance elements forming said second ratio arm, said tap selector switching means including a movable contact, voltage comparison switching means having a first fixed contact connected to the movable contact of said tap selector switching means and a second fixed contact connected to the junction of said second terminal means and said standard resistor means, said voltage comparison switching means including a movable contact, and a pair of output terminals, one of said output terminals being connected to the movable contact of said voltage comparison switching means and the other of said output terminals being connected to the junction between said ratio arms.

11. Apparatus for testing precision resistors comprising in combination, a bridge circuit having first and second series-connected ratio arms, each ratio arm including a pair of series-connected resistance elements, first and second terminal means for connecting a specimen resistor to be tested as the unknown arm of said bridge, said first terminal means being connected to one end of said series-connected ratio arms, standard resistor means connected between said second terminal means and the other end of said series-connected ratio arms, a tap selector relay having a first fixed contact connected to the junction of said pair resistance elements forming said first ratio arm and a second fixed contact connected to the junction of said pair of resistance elements forming said second ratio arm, said tap selector relay having a movable contact and including a coil, a voltage comparison relay having a first fixed contact connected to the movable contact of said tap selector relay and a second fixed contact connected to the junction of said second terminal means and said standard resistor means, said voltage comparison relay having a movable contact and including a coil, and indicating means coupled between the movable contact of said voltage comparison relay and the junction of said series-connected ratio arms.

12. Apparatus for testing precision resistors comprising in combination, a bridge circuit having first and second series-connected ratio arms, each ratio arm including a resistance element having a tap thereon, first and second terminal means for connecting a specimen resistor to be tested as the unknown arm of said bridge, said first terminal means being connected to one end of said series-connected ratio arms, standard resistor means connected between said second terminal means and the other end of said series-connected ratio arms, tap selector switching means having a pair of fixed contacts, one of said fixed contacts being connected to the tap on said first ratio arm and the other of said fixed contacts being connected to the tap on said second ratio arm, said tap selector switching means including a movable contact voltage comparison switching means having a first fixed contact connected to the movable contact of said tap selector switching means and a second fixed contact connected to the junction of said second terminal means and said standard resistor means, said voltage comparison switching means including a movable contact, a pair of output terminals, one of said output terminals being connected to the movable contact of said voltage comparison switching means and the other of said output terminals being connected to the junction between said ratio arms.

13. Apparatus for testing precision resistors comprising in combination, a bridge circuit having first and second series-connected ratio arms, each ratio arm including a resistance element having a single tap thereon, first and second terminal means for connecting a specimen resistor to be tested as the unknown arm of said bridge, said first terminal means being connected to one end of said series-connected ratio arms, standard resistor means connected between said second terminal means and the other end of said series-connected ratio arms, a tap selector relay having a first fixed contact connected to the single tap on said first ratio arm and having a second fixed contact connected to the single tap on said first ratio arm and having a second fixed contact connected to the single tap on said second ratio arm, said tap selector relay having a movable contact and including a coil for receiving an applied alternating voltage, a voltage comparison relay having a pair of fixed contacts, one of said fixed contacts being connected to the movable contact of said tap selector relay and the other of said fixed contacts being connected to the junction of said second terminal means and said standard resistor means, said voltage comparison relay further including a movable contact and a coil, phase-shifting means coupled to the coil of said voltage comparison relay, said phase-shifting means having an input for receiving an applied alternating voltage, amplifying means having an input coupled between the movable contact of said voltage comparison relay and the junction between said series-connected ratio arms, and oscilloscope means connected to the output of said amplifying means.

14. Apparatus for testing impedance elements comprising in combination, a bridge circuit, said bridge circuit including an impedance device having first and second end termnals and a mid-point, a first tap on said impedance device situated intermediate the first end terminal and said mid-point, a second tap on said impedance device situated intermediate the second end terminal and said mid-point, a pair of terminal means for connecting a specimen impedance element to be tested as the unknown arm of said bridge, one of said pair of terminal means being connected to the first end terminal of said impedance device, a standard impedance element coupled between said other terminal means and the second end terminal of said impedance device, voltage measuring means having one terminal coupled to the midpoint of said impedance device, and switching means connecting in succession the first tap on said impedance device, the second tap on said impedance device, and the junction between the unknown arm of the bridge and said standard impedance element to the other terminal of said voltage measuring means.

References Cited in the file of this patent

UNITED STATES PATENTS

| | | |
|---|---|---|
| 2,474,692 | Rossoff | June 28, 1949 |
| 2,479,051 | Sunstein | Aug. 16, 1949 |
| 2,675,701 | Bidwell | Apr. 20, 1954 |
| 2,715,208 | Hayes | Aug. 9, 1955 |
| 2,755,436 | Heinz | July 17, 1956 |

FOREIGN PATENTS

| | | |
|---|---|---|
| 943,072 | Germany | May 9, 1956 |
| 743,223 | Great Britain | Jan. 11, 1956 |

UNITED STATES PATENT OFFICE
CERTIFICATE OF CORRECTION

Patent No. 3,150,315                      September 22, 1964

Fred W. Simon

It is hereby certified that error appears in the above numbered patent requiring correction and that the said Letters Patent should read as corrected below.

Column 3, lines 70 to 73, equation (2), for the portion reading $R_{17}=R_{10}$ read $R_{16}=R_{10}$ column 10, lines 60 and 61, strike out "and having a second fixed contact connected to the single tap on said first ratio arm"; column 12, before line 10, insert 1,931,054      Butterfield-------Oct. 17, 1933

Signed and sealed this 9th day of February 1965.

(SEAL)
Attest:

ERNEST W. SWIDER                      EDWARD J. BRENNER
Attesting Officer                        Commissioner of Patents